US008745095B2

(12) United States Patent
Bestler et al.

(10) Patent No.: US 8,745,095 B2
(45) Date of Patent: Jun. 3, 2014

(54) SYSTEMS AND METHODS FOR SCALABLE OBJECT STORAGE

(71) Applicants: Caitlin Bestler, Sunnyvale, CA (US); Alexander Aizman, Santa Clara, CA (US)

(72) Inventors: Caitlin Bestler, Sunnyvale, CA (US); Alexander Aizman, Santa Clara, CA (US)

(73) Assignee: Nexenta Systems, Inc., Santa Clara, CA (US)

( * ) Notice: Subject to any disclaimer, the term of this patent is extended or adjusted under 35 U.S.C. 154(b) by 97 days.

(21) Appl. No.: 13/624,593

(22) Filed: Sep. 21, 2012

(65) Prior Publication Data

US 2013/0226978 A1    Aug. 29, 2013

Related U.S. Application Data

(63) Continuation-in-part of application No. 13/415,742, filed on Mar. 8, 2012, and a continuation-in-part of application No. 13/209,342, filed on Aug. 12, 2011, now Pat. No. 8,533,231.

(51) Int. Cl.
*G06F 17/30* (2006.01)
*G06F 21/10* (2013.01)

(52) U.S. Cl.
CPC .............................. *G06F 17/30159* (2013.01)
USPC ............................................. 707/802; 726/26

(58) Field of Classification Search
None
See application file for complete search history.

(56) References Cited

U.S. PATENT DOCUMENTS

| | | | |
|---|---|---|---|
| 6,499,083 B1 * | 12/2002 | Hamlin | 711/112 |
| 7,567,188 B1 | 7/2009 | Anglin et al. | |
| 8,250,325 B2 | 8/2012 | Holdman et al. | |
| 2003/0031123 A1 * | 2/2003 | Gilmour et al. | 370/216 |
| 2003/0037182 A1 * | 2/2003 | Bentley | 709/328 |
| 2007/0094178 A1 * | 4/2007 | Shin et al. | 706/20 |
| 2007/0153687 A1 * | 7/2007 | Attar et al. | 370/229 |
| 2007/0169179 A1 * | 7/2007 | Narad | 726/4 |
| 2007/0192376 A1 * | 8/2007 | Bentley | 707/200 |
| 2008/0134234 A1 * | 6/2008 | Deiss et al. | 725/31 |
| 2009/0132721 A1 * | 5/2009 | Soroushian et al. | 709/231 |
| 2009/0248604 A1 * | 10/2009 | Masson et al. | 706/47 |
| 2010/0082558 A1 | 4/2010 | Anglin et al. | |
| 2010/0235332 A1 | 9/2010 | Haustein et al. | |
| 2010/0274772 A1 * | 10/2010 | Samuels | 707/693 |
| 2010/0293140 A1 * | 11/2010 | Nishiyama | 707/636 |
| 2011/0219208 A1 * | 9/2011 | Asaad et al. | 712/12 |
| 2011/0246741 A1 | 10/2011 | Raymond et al. | |
| 2012/0005171 A1 | 1/2012 | Anglin et al. | |
| 2012/0116782 A1 * | 5/2012 | Punnoose et al. | 705/1.1 |
| 2012/0124046 A1 | 5/2012 | Provenzano et al. | |
| 2012/0124105 A1 | 5/2012 | Provenzano et al. | |
| 2012/0144383 A1 * | 6/2012 | Mishra et al. | 717/173 |
| 2012/0159098 A1 | 6/2012 | Cheung et al. | |
| 2013/0036427 A1 * | 2/2013 | Chen et al. | 719/312 |

* cited by examiner

*Primary Examiner* — Tarek Chbouki

(74) *Attorney, Agent, or Firm* — Okamoto & Benedicto LLP

(57) ABSTRACT

The present disclosure provides an advantageous systems and related methods for scalable object storage. One embodiment relates to a system that includes at least a manifest tracking subsystem and a chunk payload subsystem. The manifest tracking subsystem stores version manifests and encodes forward-references from the version manifests to chunks. The chunk payload subsystem stores the chunks and encodes back-references to version manifests that reference the chunk. Other embodiments, aspects and features are also disclosed.

23 Claims, 10 Drawing Sheets

SYSTEMS AND METHODS FOR SCALABLE OBJECT STORAGE

CROSS-REFERENCE TO RELATED APPLICATION(S)

The present application is a continuation-in-part of U.S. patent application Ser. No. 13/209,342, entitled "Cloud Storage System with Distributed Metadata," filed Aug. 12, 2011 by Alexander Aizman, et al., the disclosure of which is hereby incorporated by reference. The present application is also continuation-in-part of U.S. patent application Ser. No. 13/415,742, entitled "Unified Local Storage Supporting file and Cloud Object Access," filed Mar. 8, 2012 by Caitlin Bestler, et al., the disclosure of which is hereby incorporated by reference. The present application is related to U.S. patent application Ser. No. 13/552,584, entitled "System and Method for Distributed Deduplication of Encrypted Chunks," filed Jul. 18, 2012 by Caitlin Bestler, et al., the disclosure of which is hereby incorporated by reference.

BACKGROUND

1. Technical Field

The present disclosure relates generally to data storage systems. More particularly, the present disclosure relates to data storage systems supporting cloud storage system protocols.

2. Description of the Background Art

With the increasing amount of data is being created, there is increasing demand for data storage solutions. Storing data using a cloud storage service is a solution that is growing in popularity. A cloud storage service may be publicly-available or private to a particular enterprise or organization. Popular public cloud storage services include Amazon S3™, the Google File System™, and the OpenStack Object Storage (Swift) System™.

Cloud storage systems may provide "get" and "put" access to objects, where an object includes a payload of data being stored. The payload of an object may be stored in parts referred to as "chunks". Using chunks enables the parallel transfer of the payload and allows the payload of a single large object to be spread over multiple storage servers. In contrast, earlier storage systems, such as Network Attached Storage, for example, typically featured methods which use open, read, write, and close commands for dealing with shared files.

SUMMARY

The present disclosure relates to systems and methods for scalable object storage.

One embodiment relates to a system that includes at least a manifest tracking subsystem and a chunk payload subsystem. The manifest tracking subsystem stores version manifests and encodes forward-references from the version manifests to chunks. The chunk payload subsystem stores the chunks and encodes back-references to version manifests that reference the chunk. Other embodiments, aspects and features are also disclosed.

Another embodiment relates to a method for providing distributed storage of data objects. In the method, forward-references from version manifests to chunks are encoded in a manifest tracking subsystem, and back-references to version manifests that reference the chunk are encoded in a chunk payload subsystem which stores the chunks.

Other embodiments relate to methods for providing storage of data objects using a distributed storage system. In one embodiment, forward-references from version manifests to chunks are encoded in a manifest tracking subsystem which stores the version manifests. In addition, back-references to version manifests that reference the chunk are encoded in a chunk payload subsystem which stores the chunks. In another embodiment, a request to put an object into the system is received from a client of the system, and a transaction identifier for the request is obtained from a manifest tracking subsystem. A payload of the object is divided into a plurality of chunks, and the plurality of chunks are put into a chunk payload subsystem. In addition, a manifest is put into the manifest tracking subsystem. The manifest is put into the manifest tracking subsystem after the plurality of chunks are put into the chunk payload subsystem.

Other embodiments, aspects, and features are also disclosed.

DETAILED DESCRIPTION

Figure 1:
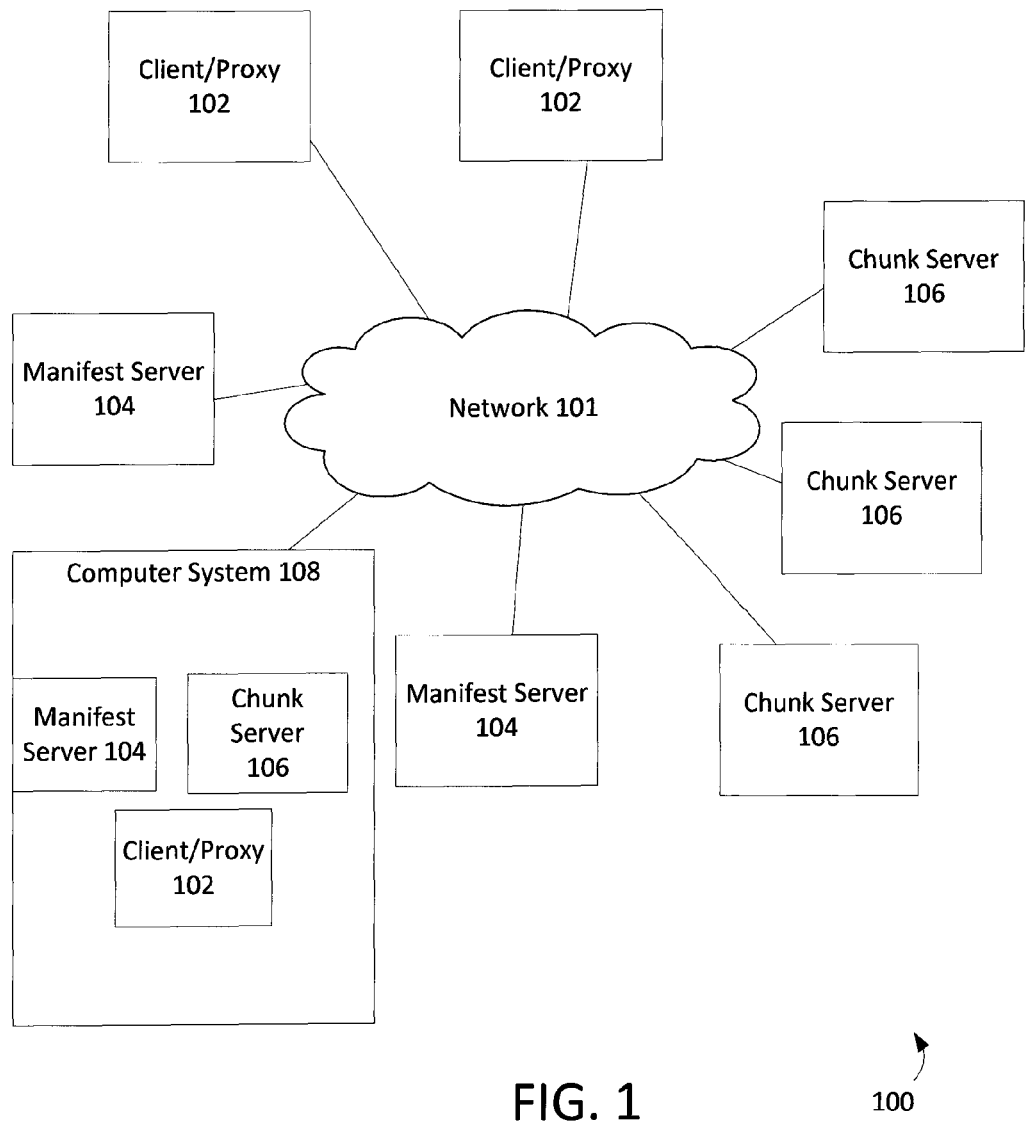
FIG. 1 is a high-level diagram of an object storage system in accordance with an embodiment of the invention.

Object Metadata in a System that Stores Chunks

Object storage systems may store an object payload in potentially sharable chunks. These chunks may be referenced by the metadata for each specific version of an object.

Traditional techniques for maintaining object metadata rely upon a single active metadata server, or tightly-coupled metadata servers that actively collaborate with each other, to control storage allocation for chunks. For example, a parallel Network File System (pNFS) metadata server explicitly controls which storage servers hold each portion of a pNFS file. With the block option under pNFS, the metadata server specifies the block servers and the precise block. With the object server option under pNFS, the metadata server merely specifies the object servers. In another example, the Hadoop Distributed File System (HDFS) metadata server (known as a "namenode") specifies the exact set of chunk servers (known as "datanode") that will hold each block in an HDFS object.

It is useful to compare the metadata burdens of a pNFS metadata server using block servers versus a pNFS metadata server using object storage or an HDFS namenode. With the block server option, the pNFS metadata server is responsible for allocating and tracking every block on every controlled block server. In contrast, with the object server option under pNFS or under HDFS, the metadata server or namenode only tracks the fact that a given chunk/block is stored on a specific server. The datanode or object server allocates its own space, thereby offloading a responsibility from the central metadata server.

Applicants have determined that the traditional technique of requiring all metadata to be handled by a single metadata server (or tightly-coupled metadata servers) places a severe constraint on the scalability of the object storage system. Instead, applicants believe that it is highly desirable for an object storage system to distribute the responsibility for maintaining object metadata over multiple servers. However, as discussed below, it becomes very challenging to orchestrate allocation of chunk storage resources when distributing metadata across multiple servers.

TERMINOLOGY

The following terminology is utilized in the present disclosure.

A "chunk" refers to a sequence of payload bytes that hold a portion of the payload for one or more objects in an object storage system.

A "chunk identifier" refers to the identifier of a specific chunk. The chunk identifier may be derived using a cryptographic hash fingerprint of the chunk payload or the compressed chunk payload. The cryptographic hash algorithm selected is preferably effectively immune from pre-image attacks. For example, the cryptographic hash may be a SHA-2 hash, such as SHA256 or SHA512.

A "chunk server" refers to a data server that is part of the chunk subsystem which stores and retrieves chunks. The chunk server preferably enforces rules on the naming of chunks so as to enable distributed deduplication. Examples of block-oriented servers that do not meet enforce such rules include a pNFS block server or an HDFS datanode.

A "client" refers to an application or host which may deal directly with manifest servers and chunk servers of the object storage system. The client may also make object get and put requests to a proxy server. The proxy server may be deployed on the same virtualization host as the client (or at least very near it). The interaction with the rest of the system is identical whether the client is an actual client or a proxy acting on its behalf.

A "class-of-storage" refers to a metadata attribute of a version manifest or a chunk that determines the nature of the storage resources that will be provided for it. In one embodiment, the class-of-storage for a version manifest may be set individually, but it may typically default to the class-of-storage of prior versions or the enclosing service directory. In accordance with an embodiment of the invention, the class-of-storage for a chunk may be automatically derived as the maximum class-of-storage for any version manifest that references the chunk.

The set of values for the class-of-storage enumerator may depend on the site-specific configuration of the system, but it should include a value reserved for version manifests and chunks that are eligible for deletion. When there are only two values defined for the class-of-storage enumerator, the class-of-storage enumerator effectively degrades to becoming a deletion-eligible Boolean flag. Such a two-value class-of-storage enumerator set is a degenerate subset of the broader description and is contemplated to be within the scope of the presently-disclosed invention.

A "designated chunk server" refers to a chunk server that is responsible for storing the chunks for a specific chunk identifier according to a consistent hashing algorithm. The local chunk server co-located with or near the client is a primary example of a non-designated chunk server (assuming that it was identified by its network location relative to the client and not by the consistent hashing algorithm).

A "designated manifest server" refers to a manifest server that is responsible for storing the version manifests for a specific object according to a consistent hashing algorithm. The local manifest server co-located with or near the client is a primary example of a non-designated manifest server (assuming that it was identified by its network location relative to the client and not by the consistent hashing algorithm).

A "manifest server" refers to a metadata server that is part of the manifest subsystem which tracks the chunks that comprise each version of an object. In accordance with an embodiment of the invention, the manifest server does not directly track the locations where those chunks are stored.

A "version manifest" refers to an encoding of the metadata for a specific version of an object held by the manifest subsystem. A version manifest for an object is held on at least the designated manifest server for the object.

Finally, a Nexenta Cloud Copy-on-Write (CCOW™) object storage system may refer to one or more object storage systems developed by, or to be developed by, Nexenta Systems of Santa Clara, Calif.

In addition to explaining the above terminology, applicants believe that it may be useful to compare the server terminology used in the present disclosure with terminology used to describe other storage systems and used in U.S. patent application Ser. Nos. 13/209,342 and 13/415,742 that were previously-filed by the applicants. The following table summarizes the different terms used to describe servers with similar roles.

TABLE 1

Terminology for Servers with Similar Roles

| Server Role | Hadoop Distributed File System | U.S. patent application No. 13/209,342 | U.S. patent application No. 13/415,742 | Present Disclosure |
|---|---|---|---|---|
| Metadata Server | Namenode | Object Metadata Server (OMDS) | Manifest Server | Manifest Server |
| Block Server | Datanode | Enhanced Chunk Server | Chunk Server | Chunk Server |
| Designated Metadata Server | Active Namenode | No specific term used. | No specific term used. | Designated Manifest Server |
| Designated Block Server | No specific term used. | No specific term used. | No specific term used. | Designated Chunk Server |

High-Level System Diagram

FIG. 1 is a high-level diagram of an object storage system 100 in accordance with an embodiment of the invention. As shown, the system 100 may include multiple clients or proxies operating on behalf of clients (client/proxy) 102, multiple manifest servers 104 and multiple chunk servers 106. A network 101 may communicatively interconnect the other components of the system 100.

In one implementation of the system 100, a client/proxy 102 may initiate an object put transaction with a manifest server 104. Subsequently, the client/proxy 102 may perform zero or more chunk puts with chunk servers 106 before completing the transaction with the manifest server 104.

The manifest servers 104 collect and serve information about objects as collections of chunks. The metadata stored about an object at a manifest server 104 may include an indication as to whether or not the chunks for the object are encrypted.

The chunk servers 106 store chunks and retrieve chunks. The chunk servers 106 may also validate the chunk identifiers ("fingerprints") of chunks put to them.

Note that each component of the storage system need not be on a separate computer system. For example, a manifest server 104 and a chunk server 106 may be implemented on a same computer system (i.e. the same machine) 108, and that computer system 108 may be connected to the network 101. In another implementation, a client/proxy 102 may also be on the same computer system 108.

Cross-Referencing Between Objects and Chunks

It is a challenging task to distribute object metadata across multiple servers in a way to efficiently use space while supporting various system features. The complexity of the problem is due, in part, because many system features are better supported if the cross-references between object metadata and chunks provide a many-to-many (not just a one-to-many) relationship. In other words, while getting an object that was previously put into the storage system requires one-object-to-many-chunk information, other system features require one-chunk-to-many-objects information. For example, distributed deduplication seeks to identify chunks that will be part of multiple objects. Even if distributed deduplication were not enabled, support of versioning, particularly with append operations, creates chunks that will be part of multiple object versions.

In developing a scalable system for distributing object metadata, applicants have determined that it is undesirable to track cross-references strictly in data controlled by the metadata subsystem. This is because all the metadata servers would have to share detailed location information as to where chunks were being located and would have to synchronize that data on every transaction. This would require tight coupling of metadata servers on a per transaction basis which would work counter to enabling scaling of metadata capacity. Forcing the metadata servers into complex synchronization lockstep procedures would undermine the scale-out benefits which are sought by the payload/metadata separation and the disaggregating of the metadata.

The pending U.S. patent application entitled "Unified Local Storage Supporting File and Cloud Object Access" (application Ser. No. 13/415,742, filed Mar. 8, 2012) relates to an earlier version of an object storage system developed by the applicants that offloads the metadata servers further than pNFS object servers or HDFS. Not only is the metadata subsystem disaggregated so that it can be distributed across many metadata servers, but those collective metadata servers are relieved of the responsibility for tracking which chunk servers store each individual chunk. Instead, the distributed metadata servers only track which chunks are being referenced. These references from the version manifests to the chunks may be referred to as forward-references. Since the forward-references do not specify the locations of the chunks, the chunks are located using a consistent hashing algorithm based upon the chunk identifier, which is calculated from a cryptographic hash of the compressed chunk payload.

In the earlier version of the system developed by the applicants, the forward-references are complemented by back-references from chunks to the version manifests. Similar to the forward-references not identifying specific chunk servers, the back-references do not identify specific manifest servers. Rather the back-references merely identified the version manifests by identifying the object and the specific version. Since the back-references do not specify the locations of the version manifests referenced, the version manifests are located using a consistent hashing algorithm based upon the object name and the enclosing service directory.

Having both forward and back-references enables a many-to-many relationship between chunks and version manifests. The same chunk can be part of many objects, even if those objects are not managed by the same manifest servers. If storage servers were specified by manifest server metadata, then it would not be possible to efficiently perform global distributed deduplication. The combination of forward and back-references also eliminates the need for tight collaboration amongst the metadata servers. Rather, the collective manifest servers manage the version manifests, while the collective chunk servers manage the chunks. These techniques enable greater scalability of object storage systems.

The present disclosure provides certain changes and improvements to the earlier version of the system developed by the applicants. These changes and improvements are aimed at solving or mitigating certain limitations and inefficiencies in the earlier version of the system.

These limitations and inefficiencies in the earlier version include the following.

a. A back-reference from each stored chunk image referenced each version of each object that referenced this chunk. Hence, a chunk may have multiple back-references pointing to different versions of the same object.

b. Back-references were only created after a committing manifest put operation referenced the chunk. However, in order to preserve referential integrity, chunks were put before the manifest referencing them was put. This means that every chunk exists for a very short period of time without being referenced by any version of any object. To distinguish between these legitimate newly created chunks and orphaned chunks that were only referenced by versions of objects that had been deleted, a grace period was defined from the time a chunk put was performed until the chunk was expected to be referenced by a version manifest. A chunk unreferenced for twice the length of the grace period is clearly an orphaned chunk and can be deleted. However, with this technique, creation of the back-reference was asynchronous from the creation of the chunk. This required revisiting each newly created chunk after the version manifest was committed, and also when each class-of-storage change was made for each version manifest. This resulted in more network bandwidth being used and less efficient usage of the storage caching.

c. Every version manifest needed to generate a distinct back-reference, even successive versions of the same object that merely appended to an existing object. This could result in excessive number of exchanges over the network. One extreme example would be a log file that is appended to numerous times. The first chunk in the log would need to back-reference every version manifest created, the second chunk would reference all but one, the third all but two, etc.

d. Each update to a version manifest class-of-storage would result in an update to the corresponding back-reference, even when the overall class of storage of the chunk was not being changed. These operations were not necessary.

Improved Cross-Referencing Between Objects and Chunks

The present disclosure provides an improved system and method of tracking the usage of chunks in a distributed object storage system. This improved technique still allows the metadata servers to track only the existence of chunks, without tracking the specific chunk servers where the chunks are stored.

A significant aspect of the object storage system disclosed herein, and of its prior version described in the above-referenced pending patent application, is that the object metadata and payload chunks are cross-referenced, but that neither the forward-reference from the object metadata to the chunk, nor the back-reference from the chunk to the object, includes information as to where the other sub-system has stored the identified resource. The identification is also not dependent on how the other sub-system has encoded the referenced data.

The object storage system disclosed in the present patent application addresses the above-identified shortcomings of the previous version of the object storage system as follows.

a. Each back-reference is made to specify an entire object, rather than just a specific version of the object.
b. Speculative back-references created during a transaction are tracked separately from verified back-references.
c. A transaction identifier (transaction ID) is created at the beginning of a transaction to put an object, and that transaction ID is used to enable creating a speculative back-reference to the object that will be created when the transaction completes, combined with deferred one-time validation that the referenced object actually references this chunk.

Figure 2:
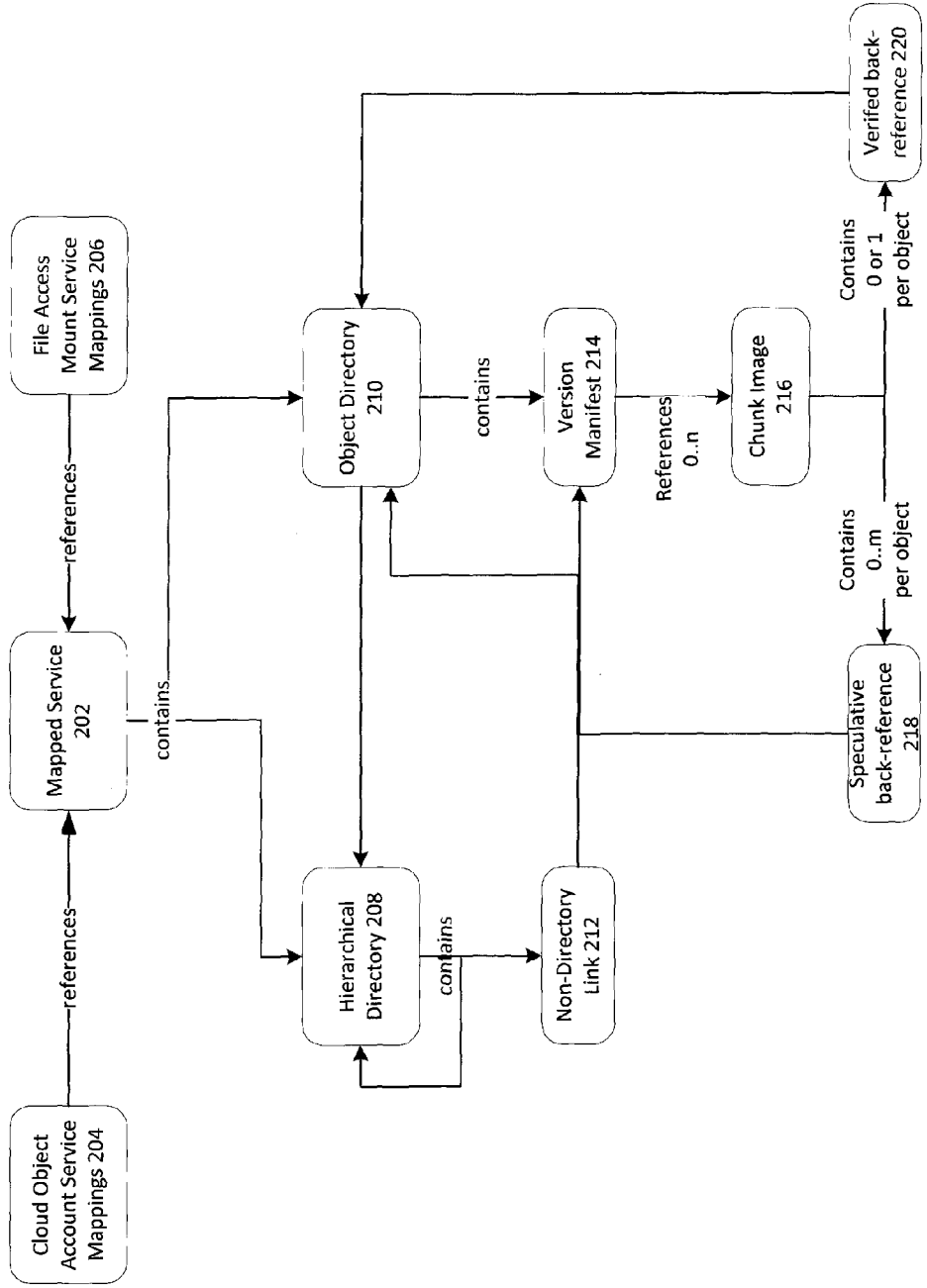
FIG. 2 shows a structure of persistent data objects that encode object storage in accordance with an embodiment of the invention.

Depicted in FIG. 2 is a data structure 200 for metadata associated with a mapped service 202 to encode object storage in accordance with an embodiment of the invention. In one embodiment, each mapped service 202 is implemented as a directory within the local file server of each storage server. Each mapped service 202 may be referenced by one or more interface-specific mapping.

The interface-specific mapping may be a cloud object account service mapping 204 (typically as a "container") or a file access mount service mapping 206 (typically as a "mount point"). The cloud object account service mapping 204 maps cloud accounts and/or containers to mapped services 202. The file access mount service mappings 206 map file system mount points to mapped services 202.

Within the context of each mapped service 202, there may be persistent storage for zero or more hierarchical directories 208 and zero or more object directories 210. A hierarchical directory 208 may contain other hierarchical directories 208 and may also contain non-directory links 212 to object directories 210 or version manifests 214.

An object directory 210 corresponds to a single object and contains version manifests 214 for the object. Each of the object directories 210 is a container for the metadata for all versions of a single object. A version manifest 214 specifies the metadata for a specific version of an object and include zero or more (0 to n) forward-references to chunk images 216. A chunk image 216 may contain speculative back-references 218 and verified back-references 220.

While the cross-referencing scheme of the prior version of the object storage system included a single type of back-reference which referenced version manifests, the cross-referencing scheme shown in FIG. 2 includes two different types of back-references: speculative back-references 218; and verified back-references 220. A speculative back-reference 218 refers to an object directory 210 that references the chunk image 216 and to a version manifest 214 for the chunk image 216. A verified back-reference 220 refers to an object directory 210 that references the chunk image 216.

Each chunk image 216 may include zero or more (0 to m) speculative back-references 218 to a particular object. Each speculative back-reference 218 is for a potentially incomplete transaction that did a put operation for this chunk. There may be multiple references from the same chunk to the same object distinguished only by their transaction identifier (transaction ID).

Each chunk image 216 may have zero or one (0 or 1) verified back-reference 220 to a particular object. In other words, there is at most one verified back-reference 220 from a given chunk to a given object. Verified back-references are created after the existence of the forward-reference from the object to the chunk has been confirmed. The existence of the forward-reference may be confirmed explicitly or implicitly. The explicit confirmation may involve a query from the chunk subsystem to the manifest subsystem and a response from the manifest subsystem to the chunk subsystem. The implicit confirmation may involve the manifest subsystem updating the class-of-storage requirement for the chunk for the object.

Figure 3:
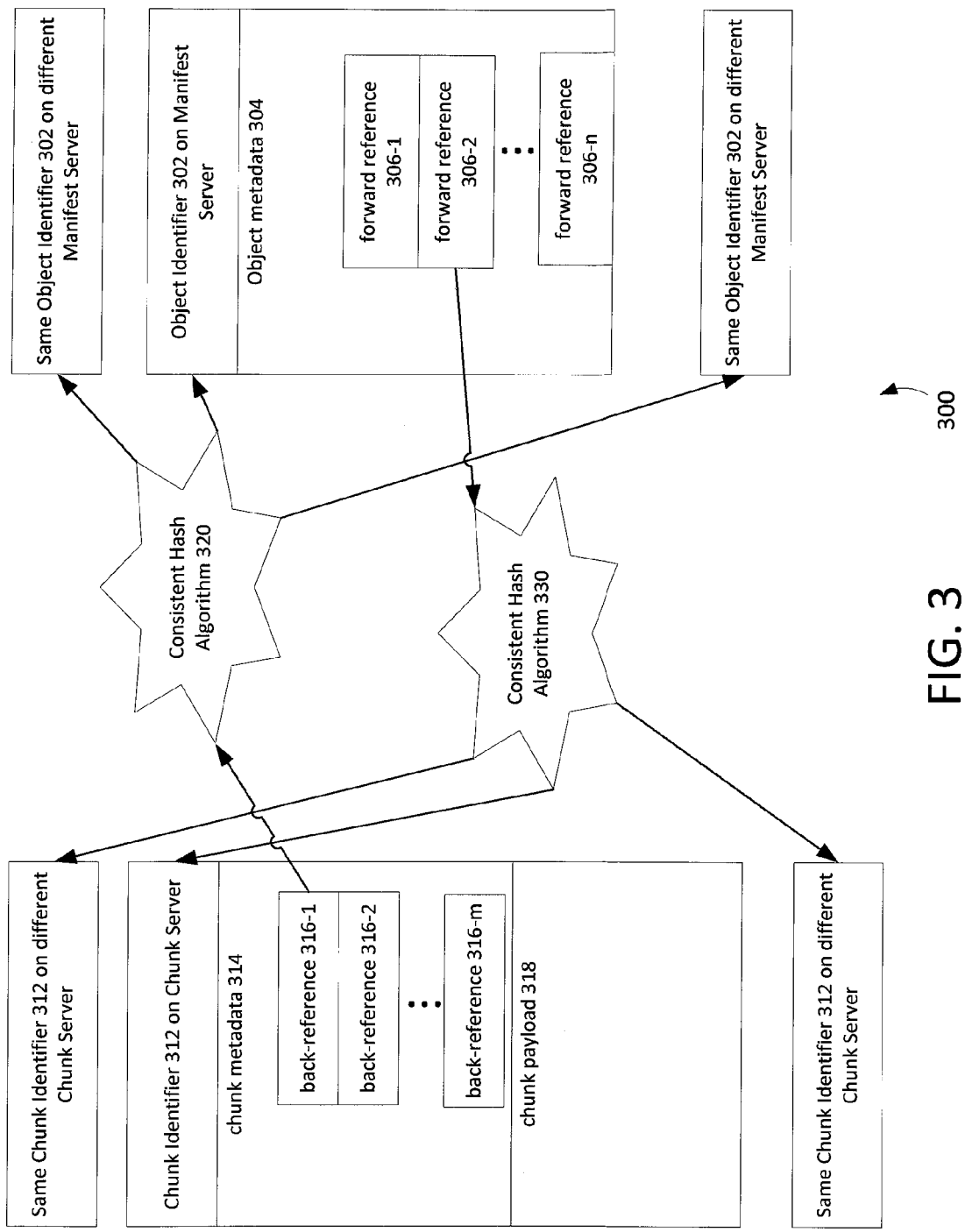
FIG. 3 depicts a system to cross-reference between objects and chunks in accordance with an embodiment of the invention.

FIG. 3 depicts a cross-referencing scheme 300 between objects and chunks in accordance with an embodiment of the invention. Object identifiers 302 are used to identify objects, and chunk identifiers 312 are used to identify chunks.

Each object identifier 302 may have associated therewith object metadata 304, and the object metadata 304 for a specific version of the object may include zero or more forward-references 306 (shown as 306-1, 306-2, ..., and 306-n). Each forward-reference 306 is a reference from an object identifier 302 to a chunk identifier 312 for a chunk belonging to the identified object. Hence, the forward-references 306 may also be referred to as chunk references.

Each chunk identifier 312 may have associated therewith chunk metadata 314. The chunk metadata 314 may include zero or more back-references 316 (shown as 316-1, 316-2, ..., and 316-n). Each back-reference 316 is a reference from a chunk identifier 312 to an object identifier 302 for an object to which the identified chunk belongs. Hence, the back-references 316 may also be referred to as object references.

The cross-referencing system 300 obtains location information from the encoded forward and back-references (306 and 316, respectively) using consistent hashing algorithms (320 and 330, respectively). A first consistent hash algorithm 320 may be used to obtain location information for a chunk identifier 312 on a chunk server that is indicated by a forward-reference 306. As depicted, the same chunk identifier 312 may be on different chunk servers, and location information for the same chunk identifier 312 on the different chunk servers may be obtained by the first consistent hash algorithm. Similarly, a second consistent hash algorithm 330 may be used to obtain location information for an object identifier 302 on a manifest server that is indicated by a back-reference 316. As depicted, the same object identifier 302 may be on different manifest servers, and location information for the same object identifier 302 on the different manifest servers may be obtained by the second consistent hash algorithm 330.

Changes that influence the location information generated by the consistent hashing algorithms, such as the addition or removal of specific storage servers, have no impact on the encoded forward or back-references. The persistent encodings of the forward and back-references are not modified, even when the storage servers they reference have been effectively changed by changes to the list of storage servers known to the consistent hashing algorithms.

Each back-reference 316 is encoded in a manner which associates it with the chunk identifier 312 from which it refers. In one embodiment, each back-reference 316 is encoded as a separate file and held within a file system directory that holds the files for all the back-references 316 for a specific chunk identifier 312. In another embodiment, all the back-references 316 for a specific chunk identifier 312 are encoded in a single file which may be edited serially. In either case, each back-reference 316 may encode the identity of the referenced object, including the service directory and relative object name, and the class-of-storage that the referenced version manifest had. The encoded back-references 316 may be persistently stored using a method that provides data integrity. In one embodiment, the ZFS file system is used to persistently store the back-references 316.

Transaction ID

As mentioned above, the improved cross-referencing scheme may utilize a transaction identifier (transaction ID) that is created at the beginning of each put transaction. In one embodiment, a manifest server may issue the transaction ID. For example, a transaction ID may be requested by performing a manifest put operation without supplying a transaction ID metadata attribute. In response, the manifest server supplies a transaction ID. In a preferred embodiment, the transaction ID may be signed by the manifest ID that issued it, and all chunk servers may be capable of validating that signature.

In accordance with an embodiment of the invention, a transaction ID encodes at least the following items: i) the identity of the object; ii) a value that uniquely identifies this specific transaction; and iii) the class-of-storage that will be assigned to the version manifest when it is committed. In a preferred embodiment, the transaction also incorporates iv) a signature that cryptographically authenticates this transaction ID as having been generated by an authorized manifest server. The transaction ID may also encode other attributes that are less relevant to the present disclosure.

The identity of the object may include the service directory 202 of which this object is a part and the object directory 210 for this object. Alternatively, the identity of the object may be specified with other information.

The specific transaction may be identified using a unique version identifier (version ID), where the version ID includes a timestamp so as to eliminate the need to add a creation timestamp when persistently recording a back-reference. Alternatively, a different field may be used to uniquely identify the specific transaction, where the field ensures that concurrent updates to the same object will have different transaction IDs.

The class-of-storage for each version manifest may be set individually, but it may typically default to the class-of-storage of prior versions or the enclosing service directory. Alternatively, the class-of-storage for the version manifest may be set in other ways.

The signature may be implemented using one of several well-known methods for cryptographically signing contents to authenticate the authoring device and prevent alterations of the content that the signature covers. The authorized manifest server may include any server belonging to a ring of manifest servers.

Back-Reference Encoding

In accordance with an embodiment of the invention, the transaction ID may be used for encoding a speculative back-reference from a chunk to the object. The speculative back-reference may be created when the transaction completes. After a deferred one-time validation that the referenced object actually references the chunk, the back-reference may be considered to be verified. A flag may be used to differentiate between speculative and verified back-references. At most, one verified back-reference is persistently stored by a chunk server for each chunk/object combination.

In addition to the transaction ID, the back-reference encoding may also include a type field and the indication of whether the back-reference has been verified or not (i.e. is verified or speculative). The type field may be used to support other forms of back-references to support other features of the system. An example of such a feature is allowing one chunk server to store a chunk for another chunk server as a form of emergency load balancing.

Orphaned Back-References

An orphaned back-reference refers to a back-reference that has no matching forward-reference. It is the possibility that the speculative back-reference may become orphaned that makes it speculative.

On an ongoing basis, each chunk server selects chunks that it has stored locally with speculative back-references that are eligible for confirmation (verification). A speculative back-reference is eligible for confirmation only after a time period has passed since the times the speculative back-reference was created. The time period is set to be substantially longer (at least twice as long, for example) than the expected time for the transaction to complete. This verification is necessary to detect back-references that have been orphaned when clients or proxies terminate without completing, or explicitly aborting, the transaction.

Figure 4:
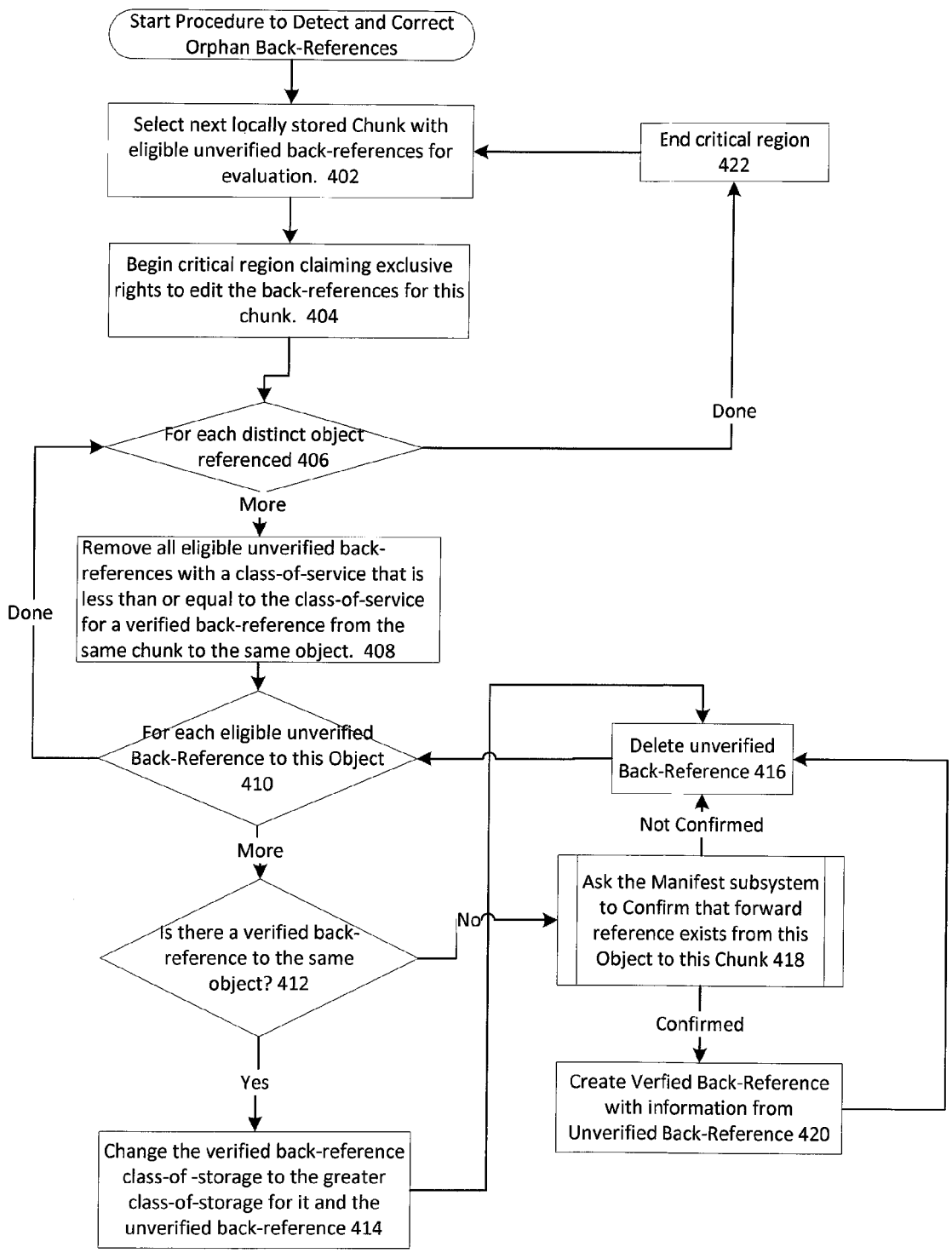
FIG. 4 is a flow chart of a method to detect and correct back-references that have been orphaned in accordance with an embodiment of the invention.

FIG. 4 is a flow chart of a method 400 to detect and correct back-references that have been orphaned in accordance with an embodiment of the invention. As shown, after the start of the procedure, a next locally-stored chunk with eligible unverified back-references (i.e. eligible speculative back-references) may be selected for evaluation per block 402.

In block 404, a "critical region" is begun. The critical region claims exclusive rights in the object storage system to edit the back-references for the selected chunk.

Per block 406, a distinct object referenced by the selected chunk may be selected for processing. Per block 408, the chunk server removes all eligible unverified back-references with a class-of-service that is less than or equal to the class-of-service for a verified back-reference from the selected chunk to the same object.

Thereafter, per block 410, a remaining eligible unverified back-reference to the selected object may be selected for processing. Per block 412, a determination may be made by the chunk server as to whether it has a verified back-reference to the same object.

If a verified back-reference to the same object is found in block 412, then, per block 414, the class-of-storage of the verified back-reference may be changed to the greater class-of-storage between it and the unverified back-reference. Thereafter, per block 416, the unverified back-reference may then be deleted, and the process may return to block 410 in which a next eligible unverified back-reference to the selected object may be selected for processing.

On the other hand, if a verified back-reference to the same object is not found in block 412, then, per block 418, the chunk server may query the manifest subsystem to confirm that a forward-reference exists from the object to this chunk. If confirmation is received, then, per block 420, a verified back-reference may be created using the information from the unverified back-reference. Thereafter, per block 416, the unverified back-reference may then be deleted, and the process may return to block 410 in which a next eligible unverified back-reference to the selected object may be selected for processing.

When all the eligible unverified back-references for the selected object has been processed, then the procedure 400 loops back from block 410 to block 406. Per block 406, a next referenced object, if any, is selected for processing.

When all the referenced objects have been processed, then the procedure 400 goes from block 406 to block 422. Per block 422, the critical region is ended (i.e. the exclusive editing rights to edit back-references for the selected chunk are released). The procedure 400 then goes back to block 402 in which selection is made of a next locally-stored chunk with eligible unverified back-references for evaluation.

Explicit Transaction Aborts

A client or proxy acting on its behalf may explicitly abort a transaction by "unputting" each chunk it has put using the Transaction ID of the transaction being aborted. The "Chunk Unput" transaction is sent to each Chunk Server where a Chunk Put had been performed. If the Chunk Server would have done a Chunk Replicate to relay a Chunk Put transaction for the referenced chunk, it will relay the Chunk Unput transaction to the same set of servers. The Chunk Server deletes the speculative back-reference created for the specific Transaction ID for the specific Chunk.

Version Manifest Aging and Updating Class-of-Storage

Hierarchical storage is a common feature of storage systems that allows the storage resources committed to a given file or object to be changed without requiring that the file or object be explicitly moved or renamed. The level of storage resources committed is typically set using a class-of-storage attribute in the metadata for the file or object. Usually, the class-of-storage attribute may be inherited from the enclosing context.

The class-of-storage attribute for a file or object may be mapped into the actual storage resources assigned. For example, a storage system may reserve SSD (solid state drive) storage for files/objects with higher class-of-storage attributes. Higher class-of-storage attributes may also assign a file/object to a disk array with greater striping for increased speed.

Object storage systems implementing the presently-disclosed invention need to assign a class-of-storage attribute to each chunk. The class-of-storage attribute for the chunk is derived from the class-of-storage attributes for the objects that include that chunk.

Figure 5:
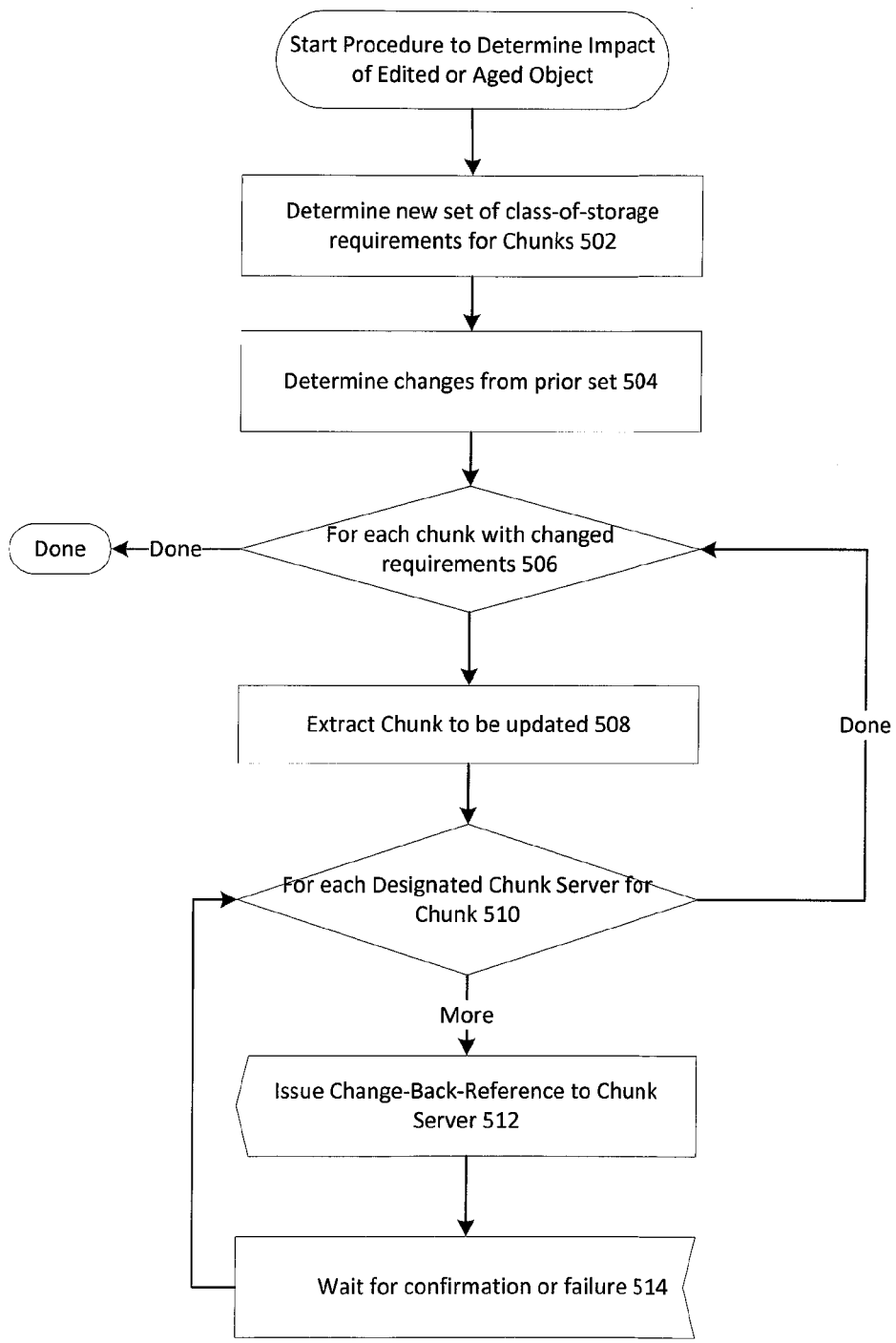
FIG. 5 is a flow chart of a method of generating notifications for class-of-service updates to the correct chunk servers in accordance with an embodiment of the invention.

The flow diagram in FIG. 5 illustrates a procedure 500 by which the manifest tracking subsystem may generate notifications to the chunk payload subsystem when the class-of-storage requirement for a specific chunk for a specific object has been updated. The class-of-storage for one or more version manifests for an object may be updated as a result of later manifest put operations, aging of the object, or deletion of version manifests. The deletion version manifests affects class-of-storage because a version of an object may be deleted by setting its class-of-storage into a 'deletion-eligible' status, and an object may be deleted by making all of its versions 'deletion-eligible'.

As shown in FIG. 5, after the start of the procedure 500, a determination is made, per block 502, as to the new set of class-of-storage requirements for the chunks of the edited or aged object. A further determination is made, per block 504, of changes from the prior set of class-of-storage requirements to the new set.

For each chunk with changed class-of-storage requirements per block 506, the chunk to be updated is extracted per block 508. Thereafter, a designated chunk server for the extracted chunk may be selected per block 510. Per block 512, a notification to change the back-reference is issued to the selected designated chunk server. The procedure 500 then waits for confirmation or a failure indication from the selected designate chunk server per block 514.

The procedure 500 may then return to block 510 in which a next designated chunk server for the chunk may be selected so as to be processed. Specific embodiments may elect to issue multiple change notifications in parallel. The algorithm is indifferent to how many are processed in parallel, as long as all are processed. When all the designated chunk servers for the chunk have been processed, then the procedure 500 may then return to block 506 in which a next chunk with changed requirements may be selected so as to be processed. When all the chunks with changed requirements have been processed, then the procedure 500 may be done.

Using the procedure 500 described above, the manifest server may determine what the maximum class of storage is for each chunk referenced by any version of an object. For every chunk where the maximum class-of-storage has changed, a back-reference edit operation may be issued to each of the designated chunk servers for this chunk.

In accordance with an embodiment of the invention, in order to protect against a race condition that can occur if an object is re-put just as the manifest server has determined that it is old enough to be deleted, the chunk servers will ignore instructions to delete a back-reference that has a timestamp which indicates that the back-reference is too recent to be verified.

The following table provides a summary which compares when back-references are edited in the prior version of the system disclosed in U.S. patent application Ser. No. 13/415,742 and when they are edited in the present disclosure.

TABLE 2

Comparison of When Back-References are Edited

| When | U.S. patent application No. 13/415,742 | Present Disclosure |
|---|---|---|
| As a result of original Object Put | A back-reference would be put from the initiating Manifest Server for each referenced chunk, even if it was only implicitly referenced. | For new Chunk Puts when this resulted in a new or upgraded class of storage requirement from this Object. Back-reference updates for implicitly included Chunks would still be needed when the append operation upgraded the class of storage for the Object (this is not typical). |
| When the class of storage attributes for an Object are updated. | For each Version Manifest with a changed class of storage, for each referenced chunk a back-reference update is issued to all designated Chunk Servers for that Chunk. | For each Chunk that has had the class of storage required for this Object to be updated, or where the base Version Manifest being referenced is being deleted, an update must be issued to the latest Version Manifest with the highest class of storage for this object to each designated Chunk Server for that Chunk. |

Chunk Get Validation

The object storage system may include an optional feature to validate Chunk Get requests to guard against clients making unauthorized Chunk Get requests. In an exemplary implementation of this feature, the Manifest Server returns the Transaction ID with the Manifest Get results. The client (or proxy on its behalf) then includes the Transaction ID in each Chunk Get. The Chunk Server then has the option of validating that a) the Transaction ID is validly signed and b) that the Chunk requested has a back-reference to the object encoded in the Transaction ID.

Note that the value to end users of this feature is limited by the fact that even without it a client has no effective way of guessing Chunk IDs. A typical embodiment will use Chunk IDs that are 256 or 512 bits with a uniform distribution. The chance of a randomly selected Chunk ID actually existing is exceedingly low. However, this can be a defense against users illicitly sharing Chunk IDs directly as a means of avoiding ACL enforcement by the Manifest subsystem. The primary example of a storage service that could benefit from this feature is a multi-user storage locker that stored media files for users, but only if the service validated that the users had the music in their possession when it created a user-specific Version Manifest that references shared chunks. Only a single copy needs to be uploaded, across all users, but the storage service retains the ability to control which specific users have access to the content even if users would seek to circumvent this by publishing Chunk IDs for others to use.

Equivalence of Reference Counting

The exemplary embodiment described herein uses explicit back-references. However, as should be evident to those skilled in the art, there are alternative embodiments that can encode equivalent information. It is intended that these alternative embodiments still conform to be within the scope of the presently-disclosed invention.

One such alternative embodiment is to maintain a single reference counter for all verified back-references. Rather than adding an extra back-reference, the reference counter would be incremented. Further, rather than deleting a specific record the chunk payload subsystem would merely trust that request was valid and decrement a reference counter. Having a reference counter reach zero would have the same meaning as having no back-references with a given class-of-storage. In an embodiment that only supported a single class-of-storage there could be a single reference counter. Such an embodiment would not be able to perform chunk get validation, but would otherwise be fully equivalent. Maintaining a reference count of verified back-references for each class-of-storage is also possible, but requires the notification of a changed class-of-storage requirement from the manifest tracking subsystem to specify both the prior class-of-storage as well as the new class-of-storage, so that the correct reference count can be decremented. The preferred embodiment uses discrete back-references because they provide for more robust error recovery, allow for auditing of back-references and are useful for forensic analysis of the data structures.

Deployment of Software Components

The disclosed system is based upon deployment of software components in three roles:

1) Manifest Servers are responsible for storing and retrieving Version Manifests for a set of objects. Objects are organized within Services, such as object storage containers. The Manifest Servers collectively must agree on an algorithm, such as a consistent hashing algorithm, to assign the responsibility to retain any specific object to a set of designated Manifest Servers.
2) Chunk Servers are responsible for storing the immutable payload for chunks and mutable metadata about chunks. Chunks are identified by a cryptographic hash fingerprint of the chunk payload. The Chunk Servers collectively must agree on an algorithm, such as consistent hashing, to assign responsibility to retain any specific chunk to a set of designated Chunk Servers.
3) A cloud storage access server is an optional component that is responsible for translating an API that deals with whole objects, such as the Amazon S3 API, into operations on chunks and version manifests.

Example Deployment with Local Servers

The following describes an example deployment of the system with local servers.

Client: the user of the Object Storage system.

LocalServer:CloudStorageAccessServer. This is typically a software component that is co-located with the client or is at least located near it. Communications between the Client and this component may be by procedure call, by a virtualization pseudo-network or by an actual network.

LocalServer:ManifestServer. A software instantiation of the Manifest Server that is co-located with the other LocalServer components.

LocalServer:ChunkServer. A software instantiation of the Chunk Server that is co-located with the other LocalServer components.

InitialDesignatedServer:ManifestServer. A Manifest Server that is one of the Designated Manifest Servers for the Object being put and which was selected by the LocalServer:ManifestServer to receive the Manifest Put operations.

InitialDesignatedServer:ChunkServer. A Chunk Server that is one of the Designated Chunk Servers for the chunk being put and which was selected by the LocalServer:ChunkServer to receive the Chunk Put operations.

OtherDesignatedServer:ManifestServer. A Manifest Server that is one of the Designated Manifest Servers for the Object being put but which was not selected by the LocalServer:ManifestServer to receive the Manifest Put transactions.

OtherDesignatedServer:ChunkServer. A Chunk Server that is one of the Designated Chunk Servers for the chunk being put but which was not selected by the LocalServer:ChunkServer to receive the Chunk Put operations.

Example Deployment with Cellular Storage Servers

The following describes an example deployment of the system which uses "Storage Cells". The "Storage Cells" are deployed as a co-located set of cloud storage access server, chunk server and manifest server.

Each Storage Cell is the designated contact point for Object Storage Services for a set of clients. These assignments would be typically based on network topology.

Each Storage Cell acts as a Local Server for its clients, but may also be a Designated Server for a subset of the Objects and Chunks created.

In typical deployments the servers comprising an object storage system will be configured to fulfill one of the roles discussed above: a storage cell, a local server or a dedicated storage server. Application of well-known zero-configuration techniques will allow a new storage server to join an existing storage cluster given only credentials to validate that it belongs to that cluster and a designated role for it to play within the object storage cluster.

Sequence of Putting an Object

This section describes an exemplary sequence to put an object into the object storage system. The depicted sequence uses point-to-point connections deployed using a local storage server model. This basic sequence may be extended to support additional features such as encryption, but such extensions would be described in those contexts.

Figure 6:
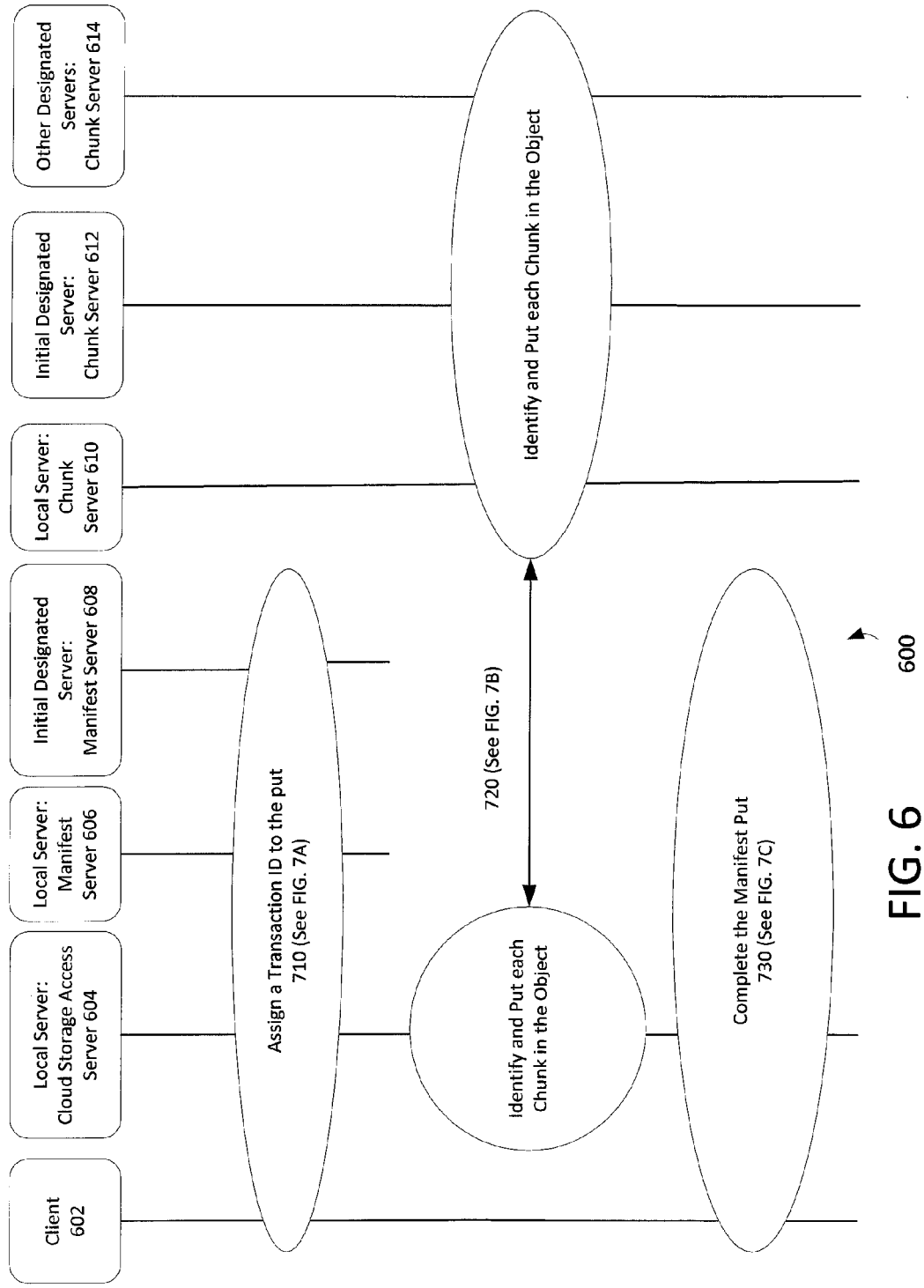
FIG. 6 is a high-level diagram illustrating an overall sequence of events for an object put transaction in accordance with an embodiment of the invention.

FIG. 6 is a high-level diagram illustrating an overall sequence 600 of events for an object put transaction in accordance with an embodiment of the invention. The sequence 600 of events may involve actions performed by a client 602, by a local server (see 604, 606 and 610), an initial designated server (see 608 and 612), and other designated servers (see 614). More particularly, the participating system elements include a client 602, cloud storage access server 604 at a local server, a manifest server 606 at the local server, a manifest server 608 at an initial designated server, a chunk server 610 at the local server, a chunk server 612 at the initial designated server, and the chunk server 614 at other designated servers.

As shown, the overall sequence 600 includes a first phase 710 where a transaction ID is assigned to the put transaction. The first phase 710 involves the client 602, the cloud storage access server 604 at a local server, the manifest server 606 at the local server, and the manifest server 608 at an initial designated server. The first phase 710 is described in detail below in relation to FIG. 7A.

In the second phase 720, each chunk in the object may be identified and put to the local and designated chunk servers. The second phase 720 involves the cloud storage access server 604 at a local server, the chunk server 610 at the local server, the chunk server 612 at the initial designated server, and the chunk server 614 at other designated servers. The second phase 720 is described in detail below in relation to FIG. 7B.

In the third phase 730, manifest put may be completed. The third phase 730 involves the client 602, the cloud storage access server 604 at a local server, the manifest server 606 at the local server, the manifest server 608 at an initial designated server, and (as shown in FIG. 7C) the manifest server 609 at other designated servers. The third phase 730 is described in detail below in relation to FIG. 7C.

Figure 7A:
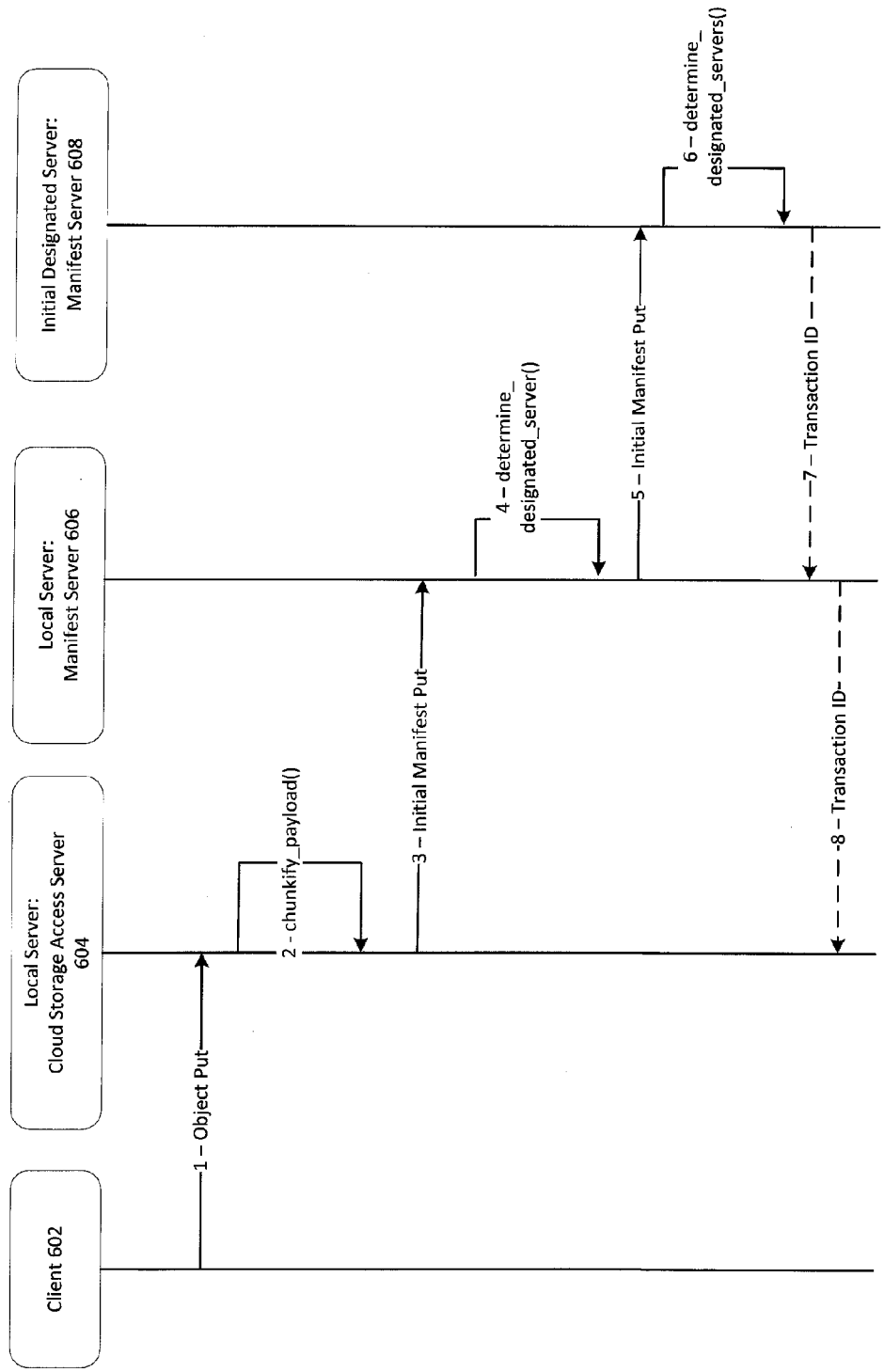
FIG. 7A is a diagram depicting a first sub-sequence of events for an object put in accordance with an embodiment of the invention.
Figure 7B:
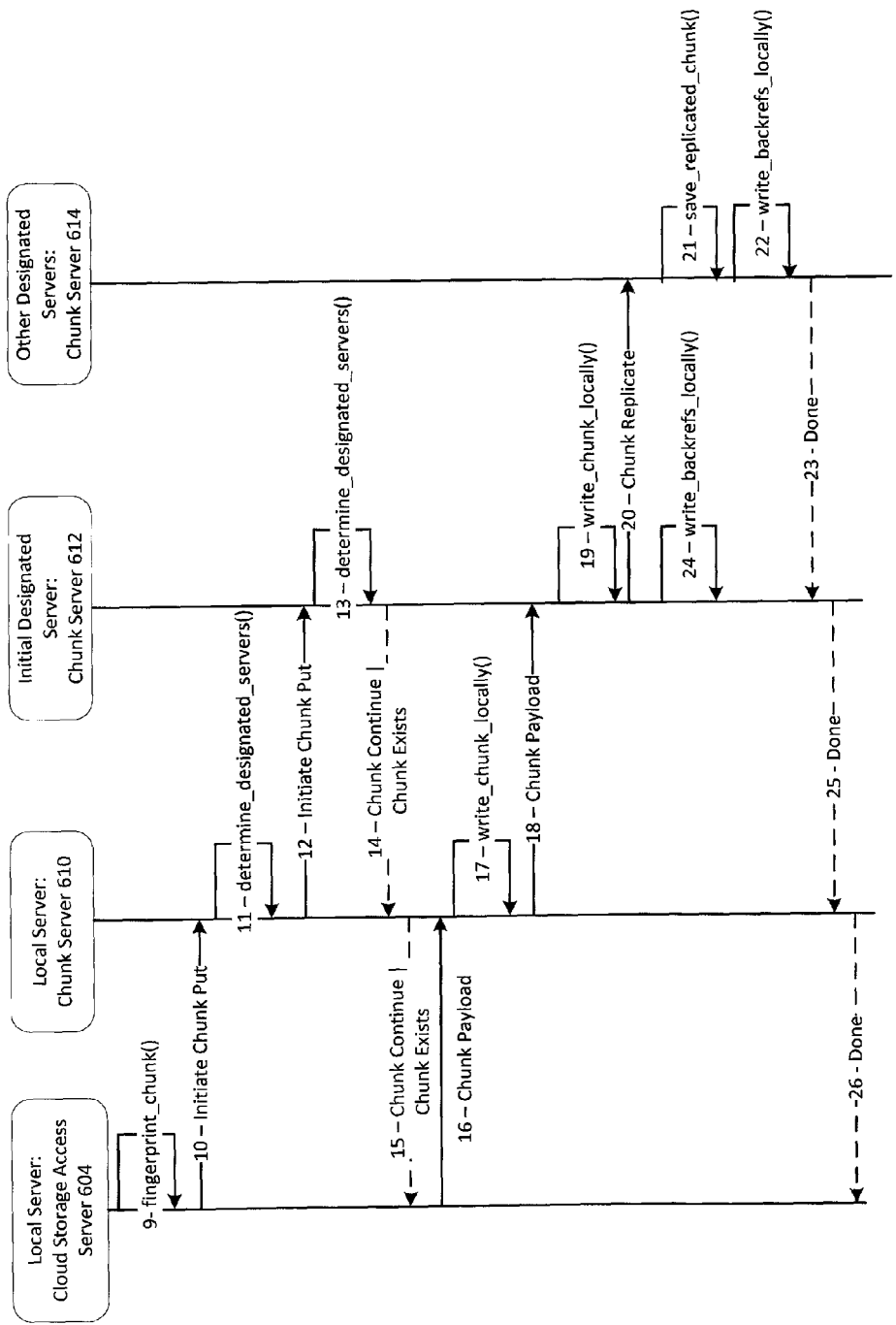
FIG. 7B is a diagram depicting a second sub-sequence of events for an object put in accordance with an embodiment of the invention.
Figure 7C:
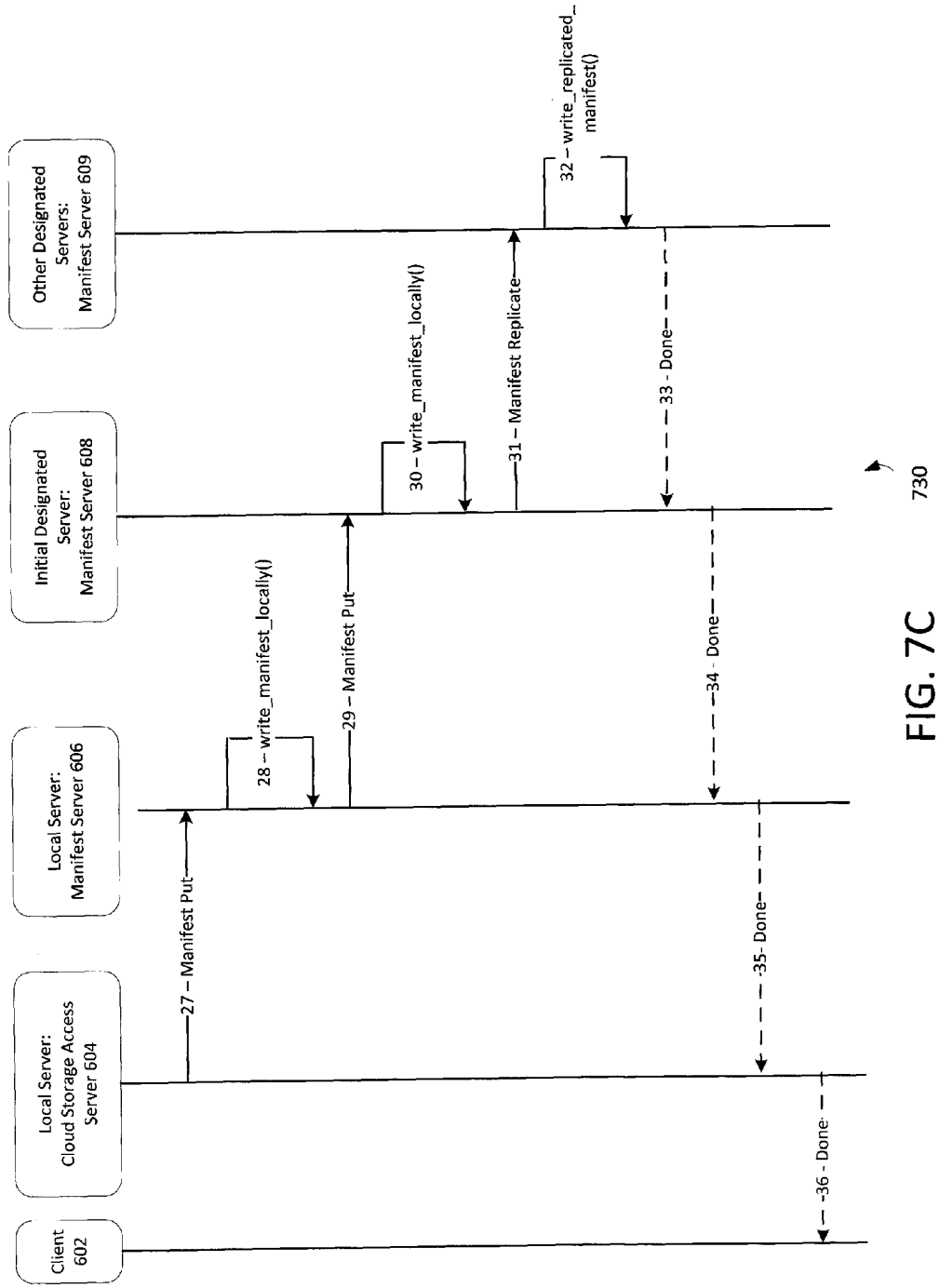
FIG. 7C is a diagram depicting a third sub-sequence of events for an object put in accordance with an embodiment of the invention.

An exemplary procedure for putting an object into the object storage system is now described in relation to the sequence of steps depicted in FIGS. 7A, 7B and 7C. The initial phase 710 of the exemplary procedure of putting an object is depicted in FIG. 7A.

1—Client makes an Object Put request. This includes a previously opened handle to the enclosing Container/Service Directory for the Object to be put.

2—After validating access permissions for the requested operation (omitted in following diagrams for simplicity), the payload is "chunkified" (i.e. divided into chunks). This may be done on a cut-through basis.

3—An initial Manifest Put is done without a Transaction ID. This identifies the Container/Service Directory, the relative Object Name, the User ID and the class-of-storage.

4—The Local Manifest Server determines the Designated Manifest Servers for this Container/Object.

5—An Initial Manifest Put is issued to one of the Designated Manifest Servers. Note that if the Local Server is one of the Designated Server it assumes the role of the Initial Designated Server as well. For such a scenario merely combine the two roles and omit the communication steps between them.

6—The Initial Designated Server determines the set of designated servers for this object. This step is necessary because the Manifest Server does not assume that it is a designated server.

7—The Initial Designated Manifest Server returns a Transaction ID that encodes at least the Container, Object, the unique version id that will be selected, the User ID and the class of storage. The Transaction ID includes a signature that will allow the Chunk Servers to validate that the Transaction ID was generated by an authorized Manifest Server and has not been altered.

8—The Transaction ID is returned to the Local Server.

At this point, we now describe the second phase 720 of the transaction which is shown in FIG. 7B. For each chunk (serially or in parallel)

9—The Local Server calculates the Fingerprint of the Chunk (after optional compression).

10—A Chunk Put request is made to the Local Chunk Server with the Transaction ID.

If the chunk is stored locally then a "Chunk Exists" status can be returned immediately after adding a Speculative Back-Reference derived from the Transaction ID. This Back-Reference edit must be replicated to the Designated Chunk Servers for this chunk (this is not shown on the diagram). Note that a non-designated Chunk Server, typically including a Local Chunk Server, does not create chunk back-references. Only Designated Chunk Servers are required to track the reasons why a Chunk must be maintained, because only the Designated Chunk Servers are required to retain a given chunk.

11—The Local Chunk Server determines the set of Designated Chunk Servers for this chunk.

12—A Chunk Put request is made to the Initial Designated Chunk Server with the Transaction ID. This includes the non-mutable Chunk Metadata: Chunk Length, Compression Algorithm and Compressed Length. It may also include modifiers to support other chunk storage features not germane to the presently disclosed invention, such as an encryption key for the chunk.

13—The Initial Designated Chunk Server determines the set of Designated Chunk Servers for this Chunk ID (i.e. it did not know in advance that it was the initial designated chunk server).

14—The Initial Designated Chunk Server returns Chunk Continue if it does not have that Chunk ID already or Chunk Exists if it does. As above, Back-Reference edits must be replicated to the Other Designated Chunk Servers (which is also not shown on the diagram).

15—The Local Chunk Server returns the Chunk Continue or Chunk Exists result.

If Chunk Continue was returned:

16—The Local Server delivers the optionally compressed Chunk Payload. In some embodiments of a Chunk storage system the payload may also be encrypted.

17—The Local Chunk Server writes the chunk to local persistent storage. The fingerprint is validated in parallel. If the fingerprint is invalid the transaction will be aborted.

18—The Local Chunk Server delivers the Chunk Payload to the Initial Designated Chunk Server. This is a cut-through relay of the Chunk Payload as received on a per-packet basis.

19—The Initial Designated Chunk Server writes the received payload to local persistent storage. It also validates the fingerprint.

For each of the other designated chunk servers:

20—A Chunk Replicate request is issued.

21—The other designated chunk server writes the chunk payload to local persistent storage. The replication target does not need to validate replicated chunks because they have already been validated by the initial chunk server. However, it is generally considered necessary to provide at least CRC32c quality error detection for storage related network transfers. Validating the payload is one method that an implementation may utilize for this purpose.

22—The other designated chunk server also writes a speculative back-reference to local persistent storage for the chunk to the object referenced in the Transaction ID.

23—Completion of the Chunk Replicate request is signaled.

24—Meanwhile, the Initial Designated Chunk Server has been writing the speculative back-reference to local persistent storage for the chunk to the object referenced in the Transaction ID.

25—Completion of the Chunk Put is signaled to the local Chunk Server.

26—Completion of the Chunk Put is signaled to the proxy.

The concluding phase 730 of the transaction is now described in relation to FIG. 7C.

27—The Local Server makes a Manifest Put request to the Local Manifest Server with the same Transaction ID but providing the Transactional Manifest of new version.

28—The Local Manifest Server applies the received Transactional Manifest saving the resulting Version Manifest.

29—The Transactional Manifest is forwarded to the Initial Designated Manifest Server in a Manifest Put request.

30—The Initial Designated Manifest Server applies the received Transactional Manifest saving the resulting Version Manifest.

For all other Designated Manifest Servers:

31—Replicate the Transaction Manifest with a Manifest Replicate operation.

32—The other designated manifest servers apply the Transaction Manifest and saving the resulting Version Manifest.

33—Completion of the Manifest Replicate operation is signaled.

34—Completion of the Manifest Put is signaled to the local Manifest Server.

35—Completion of the Manifest Put is signaled to the proxy.

36—Completion of the Object Put operation is signaled to the client.

Specific embodiments may vary these steps slightly to optimize performance, particularly to enable cut-through processing of incoming chunks. The order of steps given in this illustrative example only constrains the order in which completion of each step is confirmed.

Note that the above-described example sequence to put an object does not exclude other possible sequential interactions with the object storage system. For example, the Local Server may create a temporary stand-in Transaction ID when not in network contact with the designated servers. It would perform the necessary steps once reconnected to the network, and modify the Transaction ID as required when replaying the steps over the network.

Example Computer Apparatus

Figure 8:
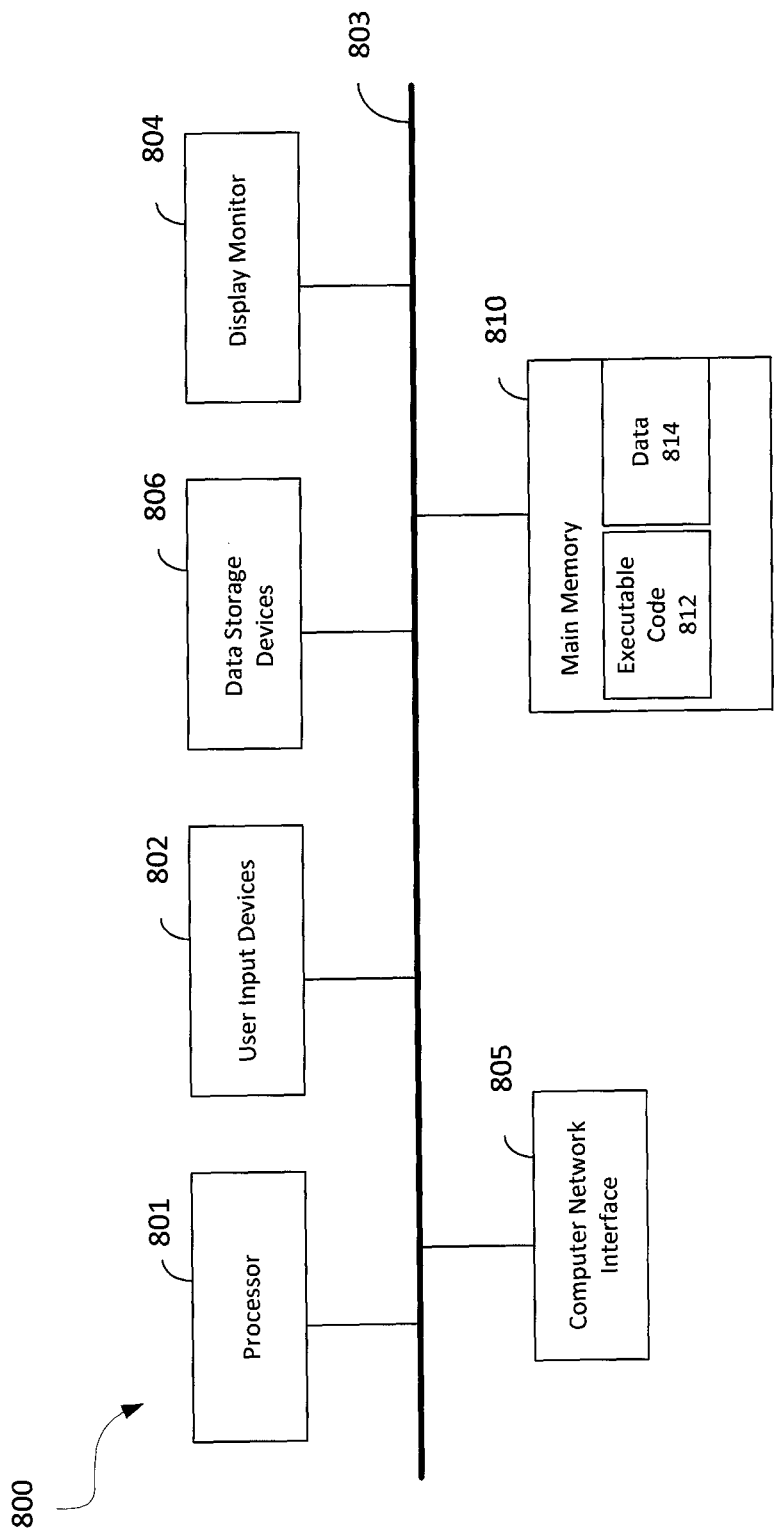
FIG. 8 depicts a simplified example of a computer apparatus 800 which may be configured as a client or a server in the system in accordance with an embodiment of the invention.

FIG. 8 depicts a simplified example of a computer apparatus 800 which may be configured as a client or a server in the system in accordance with an embodiment of the invention. This figure shows just one simplified example of such a computer. Many other types of computers may also be employed, such as multi-processor computers.

As shown, the computer apparatus 800 may include a processor 801, such as those from the Intel Corporation of Santa Clara, Calif., for example. The computer apparatus 800 may have one or more buses 803 communicatively interconnecting its various components. The computer apparatus 800 may include one or more user input devices 802 (e.g., keyboard, mouse, etc.), a display monitor 804 (e.g., liquid crystal display, flat panel monitor, etc.), a computer network interface 805 (e.g., network adapter, modem), and a data storage system that may include one or more data storage devices 806 which may store data on a hard drive, semiconductor-based memory, optical disk, or other tangible non-transitory computer-readable storage media 807, and a main memory 810 which may be implemented using random access memory, for example.

In the example shown in this figure, the main memory 810 includes instruction code 812 and data 814. The instruction code 812 may comprise computer-readable program code (i.e., software) components which may be loaded from the tangible non-transitory computer-readable medium 807 of the data storage device 806 to the main memory 810 for execution by the processor 801. In particular, the instruction code 812 may be programmed to cause the computer apparatus 800 to perform the methods described herein.

Non-Scalar Class-of-Storage Enumerators

In the preferred embodiment the class-of-storage enumerators must be defined to be linearly increasing. That is if the numeric representation of the class-of-storage enumerator is greater than another value then it represents a superior class-of-storage (alternatively, the lowest number can represent the best class-of-storage). The ability to simply compare class-of-storage enumerators simplifies processing them. However, it is possible to define class-of-storage enumerators that cannot be strictly ordered. In such an embodiment it is necessary to select a class-of-storage enumerator that encompasses all of the guarantees of either of the compared class-of-storage enumerators. The class-of-storage enumerator that encompasses all of the requirements expressed by a set of class-of-storage enumerators can be considered to be greater than or equal to the entire set.

One class-of-storage enumerator can still be considered to be "lower than" another enumerator if all of the requirements for it are less than or equal the requirements of the other enumerator, and is less than the other enumerator for at least one requirement.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A system for providing distributed storage of data objects, the system comprising:

a manifest tracking subsystem comprising a plurality of manifest server computers communicatively interconnected by a network, the manifest tracking subsystem encoding forward-references from version manifests to chunks, wherein each forward-reference references a chunk by an identity of the chunk without identifying any server on which the chunk is stored; and a chunk payload subsystem comprising a plurality of chunk server computers communicatively interconnected by the network, the chunk payload subsystem storing the chunks and encodes back-references to version manifests that reference the chunk, wherein each back-reference references an object by an identity of the object without identifying any server on which the object is stored, further wherein the back-references maintained by the chunk payload subsystem comprise speculative back-references and verified back-references, further wherein a speculative back-reference is created during a chunk put operation to put a chunk into the system, and the speculative back-reference is deleted if the speculative back-reference is of a lower class-of-storage than a verified back-reference from the chunk to the object.

2. The system of claim 1, wherein the speculative back-reference encodes a transaction identifier supplied with the chunk put operation.

3. The system of claim 1, wherein a put cancelling operation that identifies the chunk and the transaction identifier causes deletion of the speculative back-reference.

4. The system of claim 1, wherein the speculative back-reference further encodes a timestamp of the object put transaction.

5. The system of claim 1, wherein the speculative back-reference is created even when the chunk previously existed in the chunk payload subsystem.

6. The system of claim 1, wherein a verified back-reference corresponding to the speculative back-reference is created only after the manifest tracking subsystem has completed a transaction that included the chunk put operation.

7. The system of claim 1, wherein, in order to verify the speculative back-reference, the chunk payload subsystem queries the manifest tracking subsystem to confirm that there is a corresponding forward-reference to the chunk from the object.

8. The system of claim 1 further comprising:

a client which initiates an object put transaction, wherein the client obtains a transaction identifier for the object put transaction from the manifest tracking subsystem by sending a request for transaction identifier that at least includes an identity of the object to be put.

9. The system of claim 8, wherein the request for transaction identifier includes a class-of-storage identifier.

10. The system of claim 8, wherein the manifest tracking subsystem cryptographically signs the transaction identifier, and wherein the transaction identifier encodes at least the identity of the object to be put and a unique transaction identifier.

11. The system of claim 10, wherein the transaction identifier is unique even when there are multiple concurrent transactions updating the object to be put.

12. The system of claim 8, wherein the chunk payload subsystem rejects a request for a chunk put operation if the request does not supply a transaction identifier which was cryptographically signed by the manifest subsystem.

13. The system of claim 1, wherein the manifest tracking subsystem and the chunk payload subsystem collaborate to maintain a class-of-storage attribute for each chunk stored in the system.

14. The system of claim 13, wherein the manifest tracking subsystem issues a notification of a class-of-storage update when a class-of-storage required for a chunk by an object has been updated.

15. The system of claim 14, wherein the chunk payload subsystem applies the class-of-storage update to a verified back-reference.

16. The system of claim 14, wherein the chunk payload subsystem creates the verified back-reference, if necessary, by confirming a speculative back-reference between the chunk and the object.

17. The system of claim 1, wherein a chunk get operation is validated using a transaction identifier obtained from the manifest tracking subsystem and supplied to the chunk payload subsystem with the chunk get operation.

18. The system of claim 17, wherein the chunk payload subsystem rejects the chunk get operation if the chunk does not have a back-reference to an object identified in the transaction identifier.

19. A system for providing distributed storage of data objects, the system comprising:

a manifest tracking subsystem comprising a plurality of manifest server computers communicatively interconnected by a network, the manifest tracking subsystem encoding forward-references from version manifests to chunks, wherein each forward-reference references a chunk by an identity of the chunk without identifying any server on which the chunk is stored; and a chunk payload subsystem comprising a plurality of chunk server computers communicatively interconnected by the network, the chunk payload subsystem storing the chunks and encoding back-references to version manifests that reference the chunk, wherein each back-reference references an object by an identity of the object without identifying any server on which the object is stored, further wherein the back-references maintained by the chunk payload subsystem comprise speculative back-references and verified back-references, further wherein a speculative back-reference is created during a chunk put operation to put a chunk into the system, and, in order to verify the speculative back-reference, the chunk payload subsystem queries the manifest tracking subsystem to confirm that there is a corresponding forward-reference to the chunk from the object, further wherein upon confirmation of the corresponding forward-reference, a verified back-reference from the chunk to the object is created if none already exists, and a class-of-storage attribute for the verified back-reference is updated if the verified back-reference already exists, further wherein the speculative back-reference is then deleted.

20. The system of claim 19, wherein the class-of-storage attribute is updated to be a greater of the class-of-storage attributes in the speculative and the verified back-references.

21. A system for providing distributed storage of data objects, the system comprising:

a manifest tracking subsystem comprising a plurality of manifest server computers interconnected by a network, the manifest tracking subsystem encoding forward-references from version manifests to chunks, wherein each forward-reference references a chunk by an identity of the chunk without identifying any server on which the chunk is stored; and a chunk payload subsystem comprising a plurality of chunk server computers interconnected by the network, the chunk payload subsystem storing the chunks and encoding back-references to version manifests that reference the chunk, wherein each back-reference references an object by an identity of the object without identifying any server on which the object is stored, further wherein the back-references maintained by the chunk payload subsystem comprise speculative back-references and verified back-references, further wherein a speculative back-reference is created during a chunk put operation to put a chunk into the system, and, in order to verify the speculative back-reference, the chunk payload subsystem queries the manifest tracking subsystem to confirm that there is a corresponding forward-reference to the chunk from the object, further wherein upon confirmation of the corresponding forward-reference, a reference count for the chunk for the specific class-of-storage is incremented, further wherein the speculative back-reference is then deleted.

22. The system of claim 21, wherein reference counts are adjusted in response to notifications from the manifest tracking subsystem that a class-of-storage for the chunk from a specific object has changed.

23. A method for providing storage of data objects using a distributed storage system, the method comprising:

encoding forward-references from version manifests to chunks in a manifest tracking subsystem which stores the version manifests, wherein each forward-reference references a chunk by an identity of the chunk without identifying any server on which the chunk is stored; and encoding back-references to version manifests that reference the chunk, wherein each back-reference references an object by an identity of the object without identifying any server on which the object is stored, further wherein the back-references maintained by the chunk payload system comprise speculative back-references and verified back-references, further wherein a speculative back-reference is created during a chunk put operation to put a chunk into the system, and the speculative back-reference is deleted if the speculative back-reference is of a lower class-of-storage than a verified back-reference from the chunk to the object.

* * * * *